United States Patent [19]

Oh et al.

[11] Patent Number: 4,692,647
[45] Date of Patent: Sep. 8, 1987

[54] ROTOR CONSTRUCTION IN AN INDUCTION MOTOR FOR ELIMINATING ROTOR REACTION

[76] Inventors: Sang S. Oh, 205 Han Yang Apt. 7 Dong, Sihung Dong, Kuro Ku, Seoul, Rep. of Korea; Jang K. Oh, 132 E. Cardinal St., North Park, Wheeling, W. Va. 26003

[21] Appl. No.: 367,680

[22] Filed: Apr. 12, 1982

Related U.S. Application Data

[63] Continuation-in-part of Ser. No. 162,571, Jun. 24, 1980, which is a continuation of Ser. No. 874,664, Feb. 2, 1979, abandoned, which is a continuation-in-part of Ser. No. 321,544, Jan. 5, 1973, abandoned.

[30] Foreign Application Priority Data

Apr. 14, 1981 [KR] Rep. of Korea ............... 1981/1273

[51] Int. Cl.$^4$ ........................................... H02K 17/18
[52] U.S. Cl. .................................................. 310/212
[58] Field of Search ............... 310/211, 212, 182, 183, 310/263–267

[56] References Cited

U.S. PATENT DOCUMENTS 2,296,776  9/1942  Douglas ..................... 310/212 X
2,733,362  1/1956  Bauer et al. ................ 310/212 X Primary Examiner—Donovan F. Duggan
Attorney, Agent, or Firm—Roberts, Spiecens & Cohen

[57] ABSTRACT

To eliminate rotor reaction in an induction motor, double ring coils are wound on and through the rotor core in addition to the main coils at right angles to the main coil plane. By placement of a nonmagnetic material at the center of the rotor, the flux of the stator and rotor flows in separate paths at opposite sides of the rotor core and not through the shaft, to produce a transformer (induced) m.m.f. in the double ring coils. The flux which occurs due to the current of the transformer (induced) m.m.f. of the double ring coils extends substantially into the air gap by virtue of the nonmagnetic material to abate the effect of the rotor reaction in the air gap.

9 Claims, 11 Drawing Figures

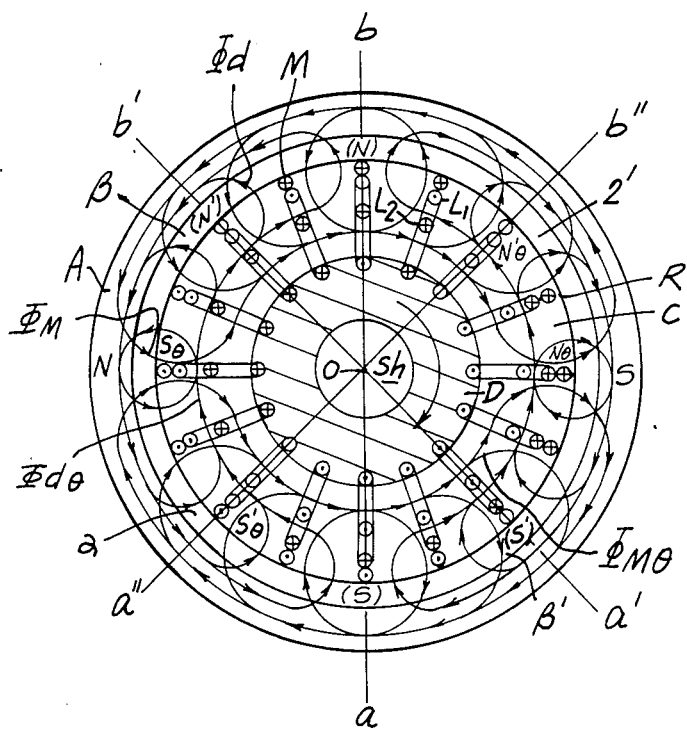
FIG. 1
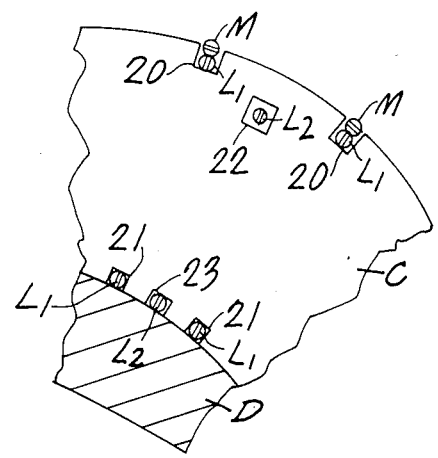
FIG. 2
FIG. 3
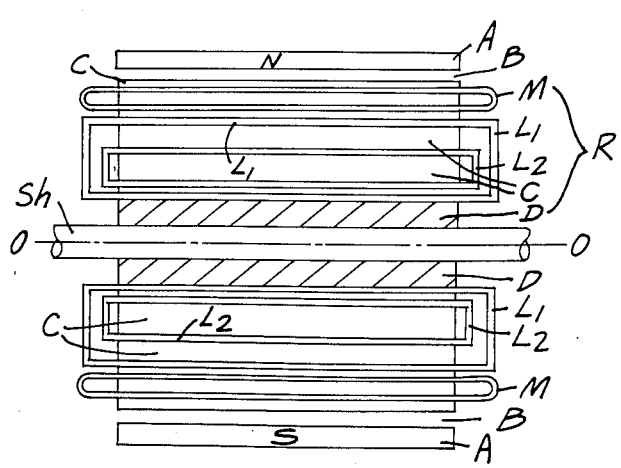

ROTOR CONSTRUCTION IN AN INDUCTION MOTOR FOR ELIMINATING ROTOR REACTION

CROSS RELATED APPLICATION

This application is a continuation-in-part of Ser. No. 162,571 filed June 24, 1980 which is a continuation of Ser. No. 874,664 filed Feb. 2, 1979 now abandoned which in turn is a continuation-in-part of Ser. No. 321,544 filed Jan. 5, 1973 and now abandoned.

FIELD OF THE INVENTION

This invention relates to an improved rotor structure for an induction motor to prevent certain undesirable effects which are inherent in the rotor of a conventional induction motor.

BACKGROUND

In a conventional induction motor, when the motor is subjected to load, certain undesirable effects occur. More specifically, when current flows through the rotor conductors, a rotor reaction is produced in the air gap which changes both the magnitude and distribution of the flux crossing the air gap and adds vectorially to the main magnetic field flux, producing a resultant magnetic field flux which lies in a different direction from the main magnetic field flux, causing phase and wave form distortions.

Another undesirable effect is the production of high frequency flux in the air gap, causing losses, heating and dielectric breakdown.

In studying these problems of the conventional motor, we have found that the rotor reaction and high frequency flux in the air gap can be greatly reduced by providing a double set of closed loop ring coils in combination with nonmagnetic material in the rotor without necessitating substantial changes in existing equipment and in normal techniques of winding and installation of such a winding.

SUMMARY OF THE INVENTION

It is a primary object of the present invention to provide an induction motor and particularly a rotor therein which overcomes the undesirable features and deficiencies associated with a conventional induction motor as described above.

It is another object of the present invention to provide an improved rotor which obviates operational problems arising from the fact that the rotor reaction reactance increases as the load current of the rotor conductors increases, thereby to attain a significant improvement in efficiency, starting characteristics and output over a conventional motor.

In accordance with the invention, we provide an improved rotor for use in an induction motor in which a nonmagnetic material is introduced in the rotor between the rotor core and shaft to substantially reduce the leakage flux through the shaft and a double set of ring coils are wound on and through the rotor core in addition to the main coils at right angles to the plane of the main coils.

According to one aspect of the invention, the main coils, double set of ring coils and nonmagnetic material are constructed as an aluminum die-casting in one piece in a squirrel cage induction motor.

When the rotor conductors carry current, rotor reaction reactance is produced in the rotor conductors (the rotor reaction reactance drop which is the difference between the e.m.f. generated at no load and the e.m.f. generated under load in an induction motor).

The rotor reaction reactance drop of the main coils is neutralized and cancelled by the substantially equal and opposite value of the transformer (induced) rotor reaction reactance drop of the double ring coils, so that the phase and wave from distortions of the resultant field flux are substantially reduced.

Therefore, the distribution of the resultant field flux substantially coincides with that of the main field flux (sinusoidal wave) in the air gap. More importantly, the cross magnetizing ampere turns of the main coils are increased together with substantial decrease of the demagnetizing ampere turns by the effect of the double ring coils.

The torque and output are therefore significantly increased.

The high frequency flux (or harmonics) in the air gap is substantially reduced by the high frequency flux of the transformer (induced) m.m.f. of the double ring coils because they are out of phase with each other by 180°. Therefore, losses, heating, magnetic noise, deterioration of the insulation and dielectric breakdown are greatly reduced.

The efficiency and life of the insulation are accordingly improved.

By using a double set of rings coils instead of a single ring coil in the rotor core, higher efficiency as well as higher torque, particularly, higher starting torque is obtained in a motor by producing substantially more transformer m.m.f. to neutralize and cancel the rotor reaction and high frequency flux in the air gap.

As a result of this improved rotor construction, the starting and running performance is significantly improved in comparison with a conventional motor.

The invention itself, together with further objects and advantages thereof may be better understood by referring to the following more detailed description taken in conjunction with the accompanying drawings.

BRIEF DESCRIPTION OF THE DRAWING

FIG. 1 is an end elevational view, partly in section, of the stator magnetic poles and rotor in a motor to illustrate a magnetic circuit in accordance with the invention.

FIG. 2 is a view on enlarged scale of a fragmented portion of the rotor in FIG. 1 showing the windings thereof.

FIG. 3 is a longitudinal sectional view taken through the motor of FIG. 1.

DETAILED DESCRIPTION OF THE PREFERRED EMBODIMENTS

Figure 4:
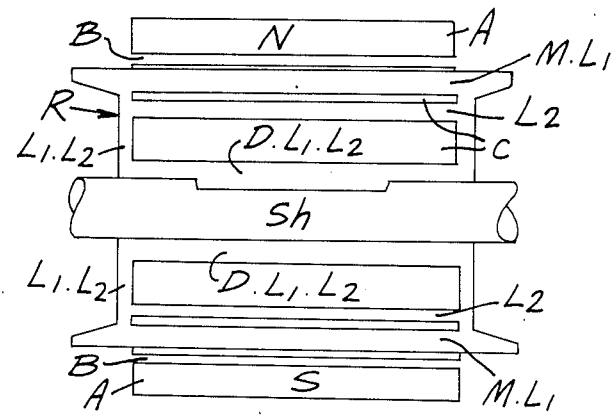
FIG. 4 is a view similar to FIG. 3 of a modified embodiment.

Referring now to the drawing in more detail, and in particularly, to FIGS. 1-3, therein is seen a motor according to the invention which comprises a stator magnet element A having North and South poles, N and S respectively, an air gap B and a drum type rotor R secured to a shaft Sh which is rotatable about an axis O—O. Wound in external slots 20 in the rotor R is a conventional main coil M. Also wound in slots 20 are first legs of a first set of ring coils $L_1$. The ring coils $L_1$ do not interfere with the main coil M and each is of closed loop form as specifically illustrated in FIG. 3. The second leg of each ring coil $L_1$ extends in another slot 21 in the rotor. The main coil M is in the form of a drum winding in the slots 20 in the rotor R and the ring coils $L_1$ extend in a plane at right angles to the main coil. Namely, coils can be considered as extending in a cylindrical plane around axis of rotation O—O, while the ring coils $L_1$ extend in radial planes passing through axis O—O. A second set of ring coils $L_2$ are wound in separate slots 22 placed more deeply in the rotor R. The second set of ring coils $L_2$ also extend in planes at right angles to main coil M. In FIG. 2, the second ring coils $L_2$ are illustrated as being angularly offset from the first ring coils $L_1$, however, in accordance with the invention, the ring coils $L_1$ and $L_2$ can be disposed in the same plane in which case the radially inward legs of ring coils $L_1$ and $L_2$ could be contained in common slots.

The rotor R comprises a rotor core C which is made of conventional magnetic materials, such as silicon steel or low carbon steel. The slots 20 and 22 are provided in the rotor core C of the rotor. Interposed between the rotor core C and shaft Sh is a cylindrical body of nonmagnetic material D which is fixedly secured to the shaft and to the rotor core C so that the entire rotor rotates around axis O—O. The nonmagnetic material of the body D can be stainless steel, aluminum, copper alloy or the like. The slots 21 for the radially inner legs of the first ring coils $L_1$ are provided in the inner periphery of the rotor core C while the slots 23 for the radially inner legs of ring coil $L_2$ are also provided in the inner periphery of the rotor core C.

The body of nonmagnetic material D alters the flux path of the magnets of the stator and rotor by reason of its nonmagnetic composition. The magnetic flux is caused to flow in a direction around both sides of the nonmagnetic material through the magnetic core C of the rotor.

FIG. 4 shows an embodiment of a squirrel cage induction motor in which the main coil M, first ring coils $L_1$, second ring coils $L_2$ and nonmagnetic material D are integrally formed as an aluminum die casting as a single piece element. The die casting is secured to the shaft for rotation therewith. The aluminum die casting is itself cast integrally with the rotor core C of magnetic material. The entire assembly is fitted within the stator A with air gap B formed therebetween.

Figure 5:
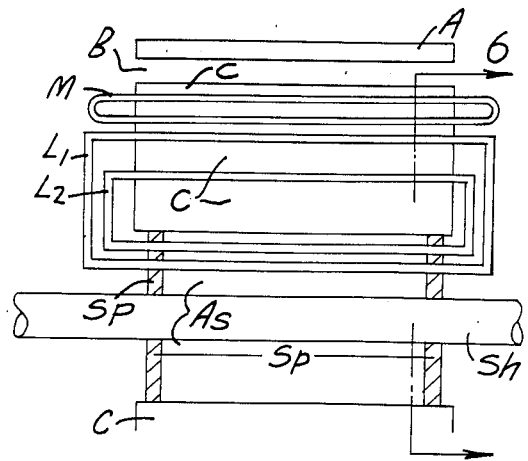
FIG. 5 is a view similar to FIG. 1 of a modified embodiment.
Figure 6:
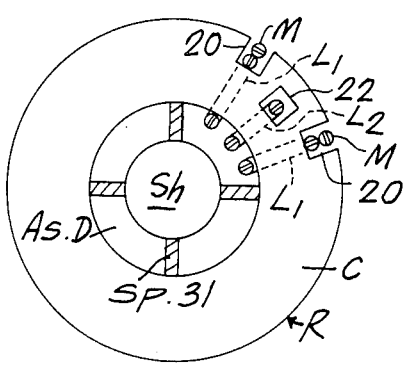
FIG. 6 is a sectional view taken on line 6—6 in FIG. 5.

In another embodiment shown in FIGS. 5 and 6, the rotor core C or magnetic material is mounted on the shaft Sh by means of a pair of spiders Sp located at the axial ends of the rotor R. Each spider has individual arms 31 which extend radially and are welded to the shaft Sh and to the rotor core C to form an air space as which serves as the nonmagnetic material D. This construction is effective for large squirrel cage and wound rotor induction motors as well as DC motors. The spiders are made of nonmagnetic material and, hence, between the shaft and the rotor core there is an air space, i.e. only nonmagnetic material as in the earlier embodiments. The main coils M are wound in the slots in the rotor core C as in the previously described embodiments. The outer legs of first ring coils $L_1$ are also wound in these slots as previously explained. Similarly, the outer legs of the second ring coils $L_2$ are wound in slots 22 more deeply in the ring coil C as in the previous embodiments. The inner legs of the first and second ring coils can be wound directly in the air space which forms the nonmagentic material D or they can be wound in slots provided in the inner periphery of the rotor core C.

FIG. 1 shows the magnetic flux path of the rotor and stator magnetic poles and the shift of the magnetic neutral in the motor. In FIG. 1 $\phi d$ is the rotor reaction flux in the air gap, $\phi M$ is the main field flux in the air gap, $\phi d\theta$ is the rotor reaction flux in the rotor core and $\phi M\theta$ is the main flux in the rotor core. The nonmagnetic material D at the center of the rotor between the rotor core and shaft has a radial extent which is considerably greater than that of the air gap B (whose size is exaggerated in FIG. 1 for purposes of illustration) whereby the body of nonmagnetic material D offers signicantly greater opposition to passage of flux compared to the air gap. Therefore, the body of nonmagnetic material D acts as a barrier to rotor core flux whereby flux change in the rotor core between the stator main flux ($\phi M\theta$) and rotor reaction flux ($\phi d\theta$) becomes opposite the flux change ($\phi M$ and $\phi d$) in the air gap with the flux having a 90° phase lag for the reasons given below.

When the rotor conductors i.e. main coils M carry current, a flux change occurs in the air gap B. The flux change in the air gap becomes $\phi M + \phi d$ in an $\alpha$ part of the N pole and the flux change in the air gap becomes $\phi M - \phi d$ in a $\beta$ part of the N pole. Therefore, the air gap of the entire N pole has a decreased flux change of $\phi M - \phi d - (\phi M + \phi d) = -2\phi d$ in the direction of rotation as has the air gap of the entire S pole ($\alpha'$ and $\beta'$ parts).

Therefore, the load magnetic neutral is shifted counterclockwise in FIG. 1 to an a', b' zone from the no load magnetic neutral a,b, zone. The counterclockwise shift in FIG. 1 is in the opposite direction to rotation and is equal to magnitude to the rotor reaction flux change ($-2\phi d$) in the air gap.

The flux change in the rotor core C is as follows.

The flux change of the rotor core becomes $\phi M\theta - \phi d\theta$ in the $\alpha$ part of the N pole and the flux change of the rotor core becomes $\phi M\theta - \phi d\theta$ in the $\beta$ part of the N pole. Therefore, the rotor core for the entire N pole has an increased flux change of $\phi M\theta + \phi d\theta - (\phi M\theta - \phi d\theta) = 2d\phi$ in the direction of rotation as has the rotor core for the entire S pole ($\alpha'$ and $\beta'$ parts).

This increased flux change ($2\phi d\theta$) of the rotor core produces an increased flux change ($2\phi'd$) of the transformer induced m.m.f. in the ring coils $L_1$ and $L_2$ in the direction of rotation. This flux change is direction to the air gap due to the placement of the nonmagnetic material D between the shaft and the rotor core C. This flux change acts to neutralize and cancel the rotor reaction flux change ($-2\phi d$) in the air gap as will be explained later.

Therefore, the load magnetic neutral is shifted clockwise to the a'', b'', zone from the no load magnetic neutral a, b, zone in the same direction as rotation by the flux change ($2\phi'd$) of the transformer induced m.m.f. of the ring coils $L_1$ and $L_2$.

Figure 7:
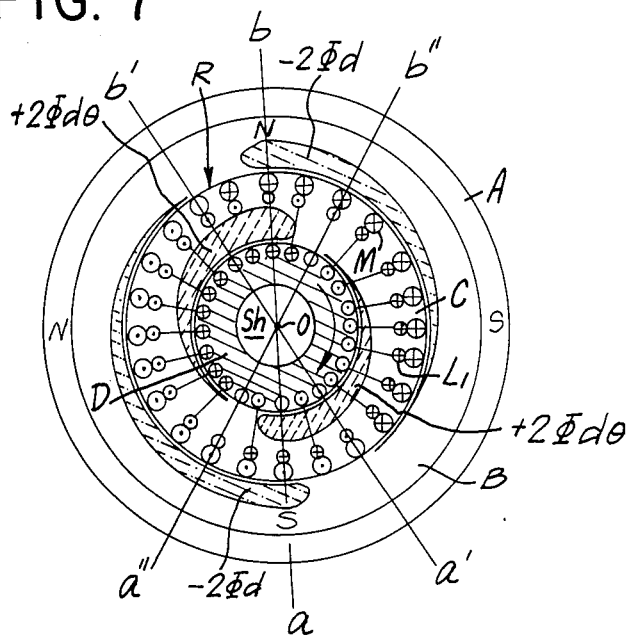
FIG. 7 diagrammatically illustrates the flux change of the rotor reaction in the air gap and rotor core and the subsequent shift of the magnetic neutral.

The relation of the rotor reaction flux change relative to the shift of the magnetic neutral will be described further with respect to FIGS. 7 and 9.

The intensity of the rotor reaction flux ($-2\phi d$) in the air gap B increases in a direction opposite to rotation as load current of the main coil M increases, so that the load magnetic neutral a', b', is accordingly moved backward in opposition to direction of rotation from the no load magnetic neutral a, b.

The intensity of the transformer rotor reaction flux ($2\phi'd$) of the ring coils $L_1$ and $L_2$ which is produced by the rotor reaction flux change ($2\phi d\theta$) of the rotor core C increases in the same direction as rotation as the load current of the main coil increases, so that the load magnetic a'', b'', is accordingly moved forward in the direction of rotation from the no load magnetic neutral a, b.

Thus, there is a corresponding shift of the load magnetic neutral from a, b, to a', b', by the rotor reaction reactance drop of the main coils, and from a, b, to a'', b'' by the transformer induced rotor reaction reactance drop of the ring coils.

Figure 9:
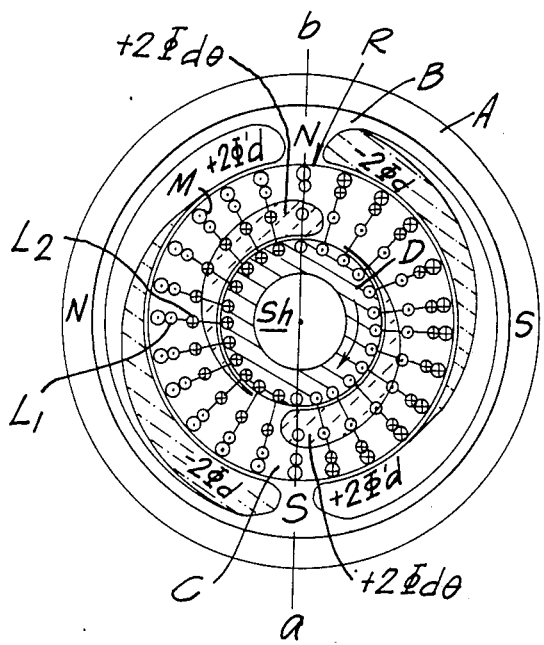
FIG. 9 diagrammatically illustrates the flux change of the rotor reaction in the air gap, rotor core an ring coil.

Therefore, the rotor reaction flux ($-2\phi d$) in the air gap is substantially neutralized by the rotor reaction flux ($2\phi'd$) of the transformer m.m.f. of the ring coils as illustrated in FIG. 9, so that the load magnetic neutral substantially coincides with the no load magnetic neutral.

That is, the phase and wave form distortion of the resultant field flux is substantially eliminated with no significant flux existing in the region of the no load magnetic neutral.

Figure 8:
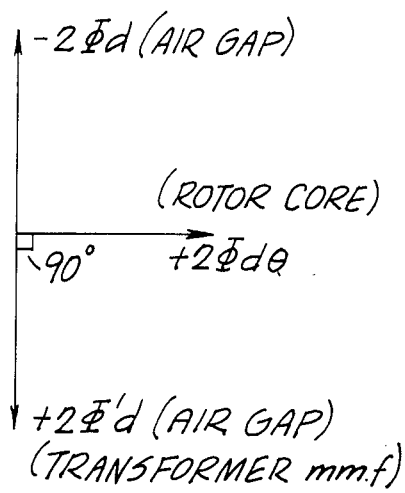
FIG. 8 is a vector diagram of the flux change of the rotor reaction in the air gap, rotor core and ring coil.

This is best seen in the vector diagram in FIG. 8.

When the main coils carry current, rotor reaction flux change ($-2\phi d$) in the air gap and rotor reaction flux change ($2\phi d\theta$) of the rotor core are produced which are 90° phase different from each other. The rotor reaction flux change ($2\phi d\theta$) of the rotor core produces the rotor reaction flux ($2\phi'd$) of the transformer induced m.m.f. in the ring coils $L_1$ and $L_2$ by the transformer action. The rotor reaction flux $2\phi'd$ is distributed to and travels radially outwards through the air gap B due to the placement of the nonmagnetic material D between the rotor core C and the shaft Sh. The rotor reaction flux $2\phi'd$ has a 90° phase difference from the rotor reaction flux change $2\phi d\theta$.

Therefore, the rotor reaction flux $-2\phi d$ of the air gap is neutralized and cancelled by the substantially equal and opposite value of the transformer rotor reaction flux $2\phi'd$ of the ring coils, so that the resultant field flux distribution substantially coincides with the main field flux distribution (sinusoidal wave) in the air gap.

Figure 10:
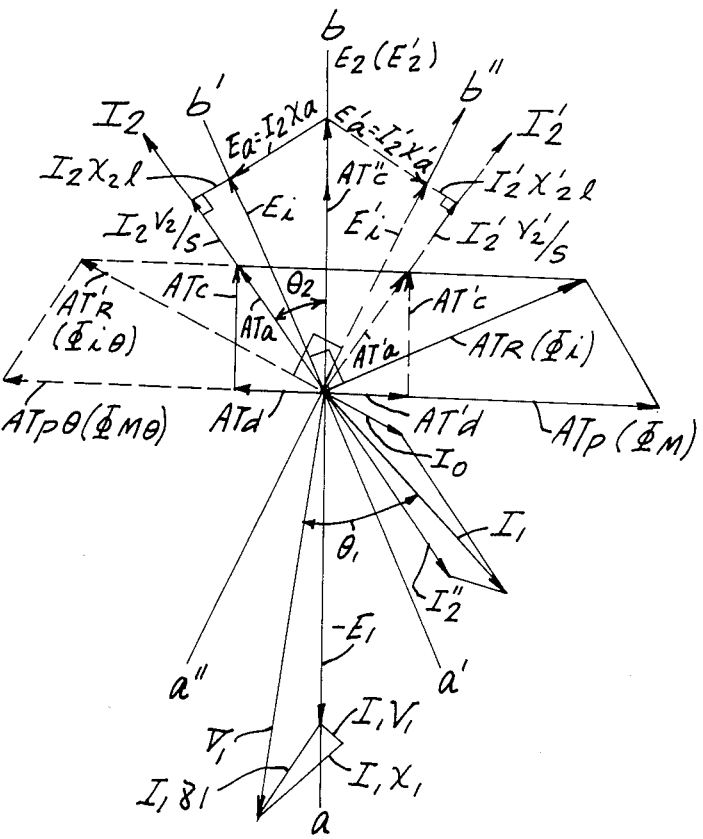
FIG. 10 is a vector diagram of the electromotive and magnetomotive forces of one phase of an induction motor in accordance with the invention.

FIG. 10 illustrates a vector diagram of the electromotive and magnetomotive forces of one phase of an induction motor in accordance with the invention.

If the voltage (Vi) is impressed on the terminals of the stator, an e.m.f. is generated in the stator coils as E1, in the rotor main coils as E2, and in the ring coils as E'2 in the direction of no load magnetic neutral a, b, by the main field m.m.f. (ATp) due to cutting the main field flux ($\phi M$).

Ei is the e.m.f. generated in the main coils by rotation. That is, the e.m.f. generated in the direction of the load magnetic neutral a', b', by the resultant field m.m.f. (ATr is the vector sum of the rotor m.m.f. ATa and main field m.m.f. ATp) due to cutting the resultant field flux ($\phi i$). The current (I2) consequently flows in the main coils and exerts a rotor m.m.f. (ATa) in phase which is the vector sum of the demagnetizing ampere turns (ATd) and cross magnetizing ampere turns (ATc).

The difference between the e.m.f. (E2) generated at no load and the e.m.f. (Ei) generated under load in the main coil is the rotor reaction reactance drop (Ea=I2 Xa).

A secondary voltage (E2) is expressed in the main coils of resistance r2, rotor leakage reactance X21 and rotor reaction reactance Xa as, $$\dot{E}2 = \dot{I}2 \, r2/s + \dot{I}2 \, jX21 + \dot{I}2 \, Xa \quad (Ea)(s=\text{slip}) \qquad (1).$$

E'i is the e.m.f. generated in the ring coils in the direction of the load magnetic neutral a'', b'', by the resultant flux ($\phi i\theta$) of the resultant m.m.f. (AT'r) of the rotor core by the transformer action. Current (I'2) consequently flows in the ring coils and exerts the transformer rotor m.m.f (AT'a) in phase which is the vector sum of the transformer demagnetizing ampere turns (AT'd) and transformer cross magnetizing ampere turns (AT'c).

The difference between the e.m.f. (E'2) generated at no load and the e.m.f. (E'i) generated under load in the ring coil is the transformer rotor reaction reactance drop (E'a=I'2X'a).

The secondary voltage is expressed in the ring coils of resistance r'2, rotor leakage reactance X'21 and rotor reaction reactance X'a as, $$\dot{E}'2 = \dot{I}'2(r'2/s) + \dot{I}'2 \, jX'21 - \dot{I}'2 \, X'a \, (E'a) \qquad (2).$$

The rotor reaction reactance drop (Ea=I2 Xa) of the main coil is neutralized and cancelled by the substantially equal and opposite value of the transformer rotor reaction reactance drop (E'a=I'2 Xa) of the ring coils (Ea−E'a=O).

If E2=E'2, I2=I'2, r2=r'2 and X21=X'21 in above equations (1) and (2), and (1)+(2), the secondary voltage (E2) of the main coil in the motor of the invention is as follows, $$\dot{E}2 = \dot{I}2 \, (r2/s) + \dot{I}2 \, jx21 \qquad (3).$$

The demagnetizing ampere turns (ATd) of the main coil is neutralized by the transformer demagnetizing ampere turns (AT'd) of the ring coils because they are of substantially equal and opposite values as illustrated in FIG. 10.

Therefore, the load magnetic netural substantially coincides with the no load magnetic neutral, so that the resultant field flux distribution is substantially the same as the main field flux distribution.

Figure 11:
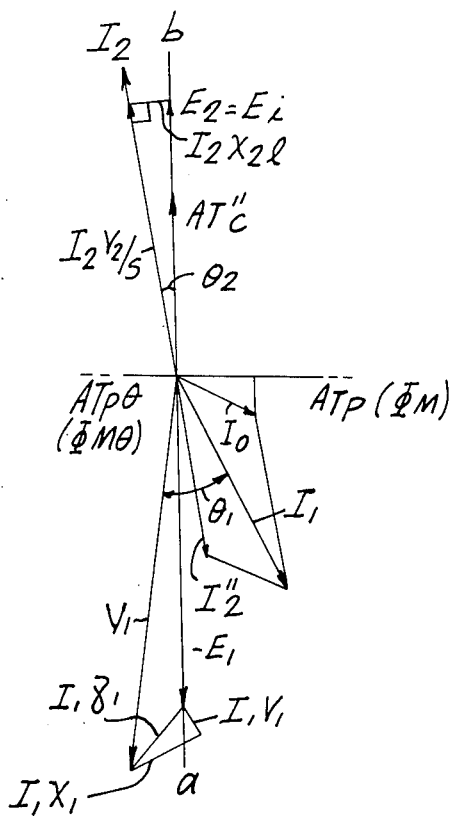
FIG. 11 is a vector diagram of the electromotive and magnetomotive forces of one phase of the induction motor of the invention after elimination of the rotor reaction reactance drop.

The internal voltage (Ei) of the main coil substantially increases to approach the secondary voltage (E2) as seen in FIG. 11, so that the slip and input current decrease and the secondary power factor (cos $\theta 2$) increases.

The cross magnetizing ampere turns (ATc) of the main coil is increased by the transformer cross magnetizing ampere turns (AT'c) of the ring coil because they are in phase with each other (AT″c is a vector sum of ATc and AT′c).

Therefore, the torque and output substantially increase.

The efficiency is also improved since the high frequency flux and harmonics which determine the loss and heating are substantially reduced without skewing of rotor slots.

As seen from the above, the invention is essentially directed to an inductor motor which comprises the stator A having the North and South poles and the rotor R within the stator forming the air gap B therewith. In accordance with the teachings of the invention, the rotor includes rotor core C of magnetic material with main winding M thereon effecting magnetic interaction between the rotor and stator and a second winding consisting of first and second sets of ring coils $L_1$ and $L_2$ wound at right angles to the main winding M. The nonmagnetic means consisting of the nonmagnetic member D in the embodiment of FIGS. 1-3 or the central portion of the die cast assembly in FIG. 4 of the air space in the spider-supported rotor in FIGS. 5 and 6 opposes passage of the flux produced in the first and second sets of ring coils, due to transformer induced m.m.f. in the ring coils, to cause this flux to pass to the air gap and oppose the rotor reaction flux therein.

Although the invention has been described in conjunction with specific embodiments thereof, it will become apparent to those skilled in the art that numerous modifications and variations can be made within the scope and spirit of the invention as defined in the attached claims.

What is claimed is:

1. An induction motor comprising a stator having North and South poles, a rotor within said stator to form an air gap therewith, said rotor being rotatable relative to the stator, said rotor including a rotor core of magnetic material, a main winding on said rotor core effecting a magnetic interaction between said rotor and stator, a second winding at right angles to said first winding, said second winding including first and second independent sets of respective, isolated coils of closed loop configuration, said first and second sets of coils producing flux due to transformer induced m.m.f. in the coils, said rotor further including a non-magnetic means fixed within said rotor core and extending the axial extent thereof for opposing passage of flux produced in said first and second sets of coils to cause said flux to pass to said air gap and oppose rotor reaction flux in said air gap, said rotor and stator being concentric cylinders, the outer of which is said stator and the inner of which is said rotor, said main winding being wound on the periphery of said rotor, said first and second sets of coils being wound in radial planes on said rotor.

2. A motor as claimed in claim 2 wherein said main winding is of drum type, said rotor core being slotted to receive said main winding.

3. A motor as claimed in claim 1 wherein said nonmagnetic means comprises a nonmagnetic body fixedly secured to said rotor within said rotor core, said main winding, second winding and nonmagnetic body being an integral common body.

4. A motor as claimed in claim 3 wherein said integral common body is a die-casting.

5. A motor as claimed in claim 3 wherein said rotor core is secured to said integral common body for rotation therewith.

6. A motor as claimed in claim 1 wherein said rotor core is cylindrical and said nonmagnetic means comprises a cylindrical member of nonmagnetic material within said rotor core, said first and second sets of coils of said second winding respectively including a plurality of independent coils of said closed loop configuration wound on said rotor in radial planes, said first winding being a main coil of drum-type wound on said rotor core.

7. A motor as claimed in claim 6 wherein said main coil is wound in first slots in said rotor core, said first set of coils having legs wound in the same slots as said main coil, said second set of coils having legs wound in separate second slots provided in said rotor core, said second slots being radially inwards of said first slots.

8. A motor as claimed in claim 7 wherein said first and second sets of coils have further legs wound in further slots in the inner periphery of said rotor core.

9. A motor as claimed in claim 1 wherein said motor includes a rotatable shaft and said rotor further comprises a spider member secured to said shaft and to said rotor core to hold the latter in spaced relation from said shaft to form an air gap constituting said nonmagnetic means.

* * * * *